United States Patent
Ramesh et al.

(10) Patent No.: US 7,929,461 B2
(45) Date of Patent: Apr. 19, 2011

(54) CONTROLLER AREA NETWORK PERFORMANCE PARAMETERS MEASUREMENT

(75) Inventors: PE Ramesh, Bangalore (IN); Godfree Coelho, Bangalore (IN); RN Prasanna, Bangalore (IN)

(73) Assignee: Tekronix, Inc., Beaverton, OR (US)

( * ) Notice: Subject to any disclaimer, the term of this patent is extended or adjusted under 35 U.S.C. 154(b) by 528 days.

(21) Appl. No.: 11/447,330

(22) Filed: Jun. 5, 2006

(65) Prior Publication Data
US 2007/0008904 A1  Jan. 11, 2007

(51) Int. Cl.
*H04L 12/40* (2006.01)

(52) U.S. Cl. ............... 370/257; 370/451; 710/100

(58) Field of Classification Search ........... 370/229, 370/257, 403, 254, 451; 711/100, 111; 710/107–110, 100; 719/319
See application file for complete search history.

(56) References Cited

U.S. PATENT DOCUMENTS

| | | | |
|---|---|---|---|
| 5,640,600 A * | 6/1997 | Satoh et al. | 710/33 |
| 5,717,440 A * | 2/1998 | Katsura et al. | 345/558 |
| 6,373,376 B1 * | 4/2002 | Adams et al. | 370/445 |
| 6,393,379 B1 * | 5/2002 | Gumbel | 702/183 |
| 6,665,601 B1 * | 12/2003 | Nielsen | 701/50 |
| 6,731,089 B2 * | 5/2004 | Cho et al. | 318/560 |
| 7,315,964 B2 * | 1/2008 | Takahashi et al. | 714/39 |
| 7,333,504 B2 * | 2/2008 | Nichols | 370/447 |
| 7,403,560 B2 * | 7/2008 | Gamper et al. | 375/228 |
| 7,441,225 B2 * | 10/2008 | Boutin et al. | 716/18 |
| 2002/0172211 A1 * | 11/2002 | Nichols | 370/412 |
| 2005/0288826 A1 * | 12/2005 | Tassitino et al. | 700/295 |

* cited by examiner

*Primary Examiner* — William Trost, IV
*Assistant Examiner* — Roberta A Shand
(74) *Attorney, Agent, or Firm* — Thomas F. Lenihan; Francis I. Gray

(57) ABSTRACT

A method of measuring bus traffic on a controller area network (CAN) is described. Accordingly, in one embodiment, a digital oscilloscope acquires the CAN bus signal in the form of a waveform in real-time. The waveform is converted into a bit stream, and the bitstream is analyzed to carry out various measurements in a CAN measurement system. The method may be used for continuous monitoring of bus traffic and measuring of various parameters related thereto, such as bus occupancy by a particular node. The acquired data may be analyzed for measuring bus occupancy by various types of CAN message frames. The user is presented with a data display and a graphical display of the measurements. Also, the user is allowed to enter an identifier for a node to obtain measurements relating to that particular node.

7 Claims, 5 Drawing Sheets

CONTROLLER AREA NETWORK PERFORMANCE PARAMETERS MEASUREMENT

FIELD OF THE INVENTION

The present invention relates generally to digital storage oscilloscopes and more particularly to controller area network measurements using digital storage oscilloscopes.

BACKGROUND OF THE INVENTION

Controller area network (CAN) is a communication network for message transaction in a small-scale distributed environment. Usually, a CAN network is used for transferring information to and from sensors and actuators in a system or sub-system for real-time control applications. It is used extensively in automotive and control systems to transmit and receive messages across different electronic control units (nodes).

The CAN bus was designed to operate at speeds up to 1 Mbps. Data is transmitted in messages containing between 0 to 8 bytes. Each message has a header, called an "identifier", that is 11 bits or 29 bits long. Based on the identifier, the individual nodes decide whether or not to process the message and also determine the priority of the message in terms of competition for bus access.

When two nodes start transmitting messages simultaneously in a controller area network, the higher priority message overrides the lower priority message. Therefore, the node with lowest priority once again tries to gain access on the bus when the bus is idle. It may, however, be possible that the lower priority node never gets an access to the bus for transmission. These low priority messages will have more latency time compared to the high priority messages. This latency prevents the CAN bus from operating on the real time system where all the messages have to be transmitted at regular intervals without any latency.

In order to design a controller area network and to ensure that low priority messages are missed to the least extent possible, bus traffic measurements may be required to be carried out. The effectiveness of transmission (throughput) is gauged based on the amount of data transmitted in a given time.

Generally, CAN analyzers are used for analyzing bus traffic on a CAN network. They may form part of the CAN network, and may be used to continuously monitor and display the bus traffic measurements. Further, a designer may be required to comply with performance requirements for the CAN network for efficient use of CAN network communication, which may involve several iterations.

However, there is a requirement for much detailed information on CAN performance parameters in order to optimize the design of the CAN network. Also, since design of the CAN network may involve several iterations to achieve a desired message transfer, bus occupancy measurement is required.

SUMMARY OF THE INVENTION

A method for measuring bus traffic on a controller area network (CAN) is described. In one embodiment, a digital oscilloscope acquires a CAN bus signal in the form of a waveform in real-time. The waveform is converted into a bitstream, and the bitstream is used to carry out various measurements in a CAN measurement system. The method may be used for continuous monitoring of bus traffic and measuring of various parameters related thereto. Alternatively, a post analysis of acquired data may be carried out.

The method allows for separate analysis of individual nodes of the network. Exclusive analysis of various types of message frames may also be carried out. The various measurements made may be viewed in the form of a graphical representation for quick analysis of the data. The method may be implemented in multiple types of digital storage oscilloscopes. Further, the method is applicable to various standards of CAN such as, for example, standard and extended CAN message formats.

The CAN measurements are obtained by initially acquiring a signal from the CAN network in the form of a waveform. The method thus allows for much accurate results. Further, the user is provided with various details, such as occupancy of the CAN bus by a particular node. This greatly assists the CAN network designer in designing or modifying the CAN network design.

Further, the user is allowed to do a post analysis on the acquired data. The user may be allowed to enter a unique identifier for a node to obtain measurements related to that node.

Various measurements may be made available to the user in the form of a display. The display may provide for a quick and easily comprehensive details of measurements, allowing the designer to take further steps in optimizing the network or the scheduling algorithm, i.e., helping in designing a reliable CAN network.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE EMBODIMENTS

A method for measuring bus traffic on a controller area network (CAN) is described. Accordingly, in one embodiment, a digital oscilloscope acquires a CAN bus signal in the form of a waveform in real-time. The waveform is converted into a bitstream which is used to carry out various measurements in a CAN measurement system. The method may be used for continuous monitoring of bus traffic and measuring of various parameters related thereto. Alternatively, a post analysis of the acquired data may be carried out.

The method allows for separate analysis of individual nodes of the CAN network. Exclusive analysis of various types of message frames may also be carried out. The various measurements made may be viewed in the form of a graphical representation for quick analysis of the data.

The method described herein is explained using specific exemplary details for better understanding. However, the method may be worked on by a person skilled in the art without the use of these specific details. The method may be implemented in multiple types of digital storage oscilloscopes. Further, the method is applicable to various standards of CAN such as, for example, standard and extended CAN message formats. Structures and devices shown in block diagram form are illustrative of exemplary embodiments of the method and are meant to avoid obscuring the method. Also, the connections between various network elements may not necessarily be direct and the data transfer in-between may be subjected to encoding, re-formatting or modifications.

References in the specification to "one embodiment" or "an embodiment" means that a particular feature, structure, characteristic or function described in connection with the embodiment is included in at least one embodiment of the method. The appearances of the phrase "in one embodiment" in various places in the specification are not necessarily all referring to the same embodiment.

Figure 1:
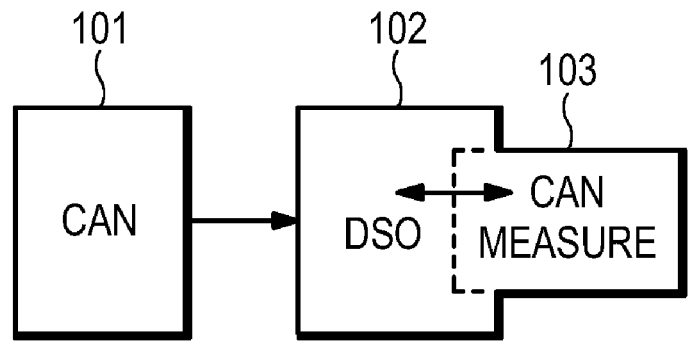
FIG. 1 generally illustrates an exemplary set up for measuring CAN network performance parameters as per one embodiment of the present invention.

FIG. 1 illustrates a general set up for controller area network (CAN) measurements as per an exemplary embodiment. A digital storage oscilloscope (102) may be connected to a controller area network (101), which needs to be analyzed for various measurements. As shown in FIG. 1, a CAN measurement system 103, for decoding and analyzing may be connected to the digital storage oscilloscope (102). Alternatively, the CAN measurement system (103) may form a part of the digital storage oscilloscope (102).

Figure 2:
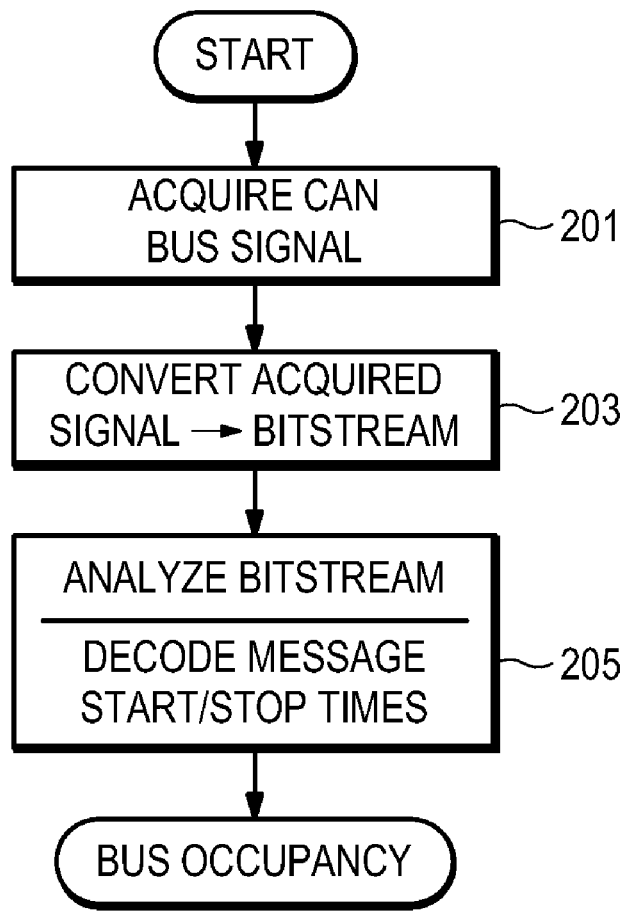
FIG. 2 is a flowchart describing the general method of measuring the CAN network performance parameters.

FIG. 2 shows the method of measuring CAN network performance parameters. The method involves acquiring (201) the CAN bus signal. The CAN bus rate may be set by directing the Digital Storage Oscilloscope (DSO) (102) to acquire signals for a short duration of time such as, for example, 1 second. The DSO (102) may be set to have a sample rate and record length of for the signal being acquired. This may be set so as to ensure that ten samples for a defined data interval are acquired by the DSO (102). The DSO (102) thus triggers on the CAN bus signal and acquires the waveform.

The waveform, thus acquired, may further be converted into a bitstream (203) for inferring various measurement details. Specifically, the acquired waveform may be converted into a bitstream using an edge finding technique and a known value for the data interval. The bitstream may further be decoded to obtain further information regarding message frames. Accordingly, decoding the waveform allows the start and end of each message frame to be identified, and the bitstream may be converted into CAN protocol messages.

The bitstream may further be analyzed (205) to obtain information on individual message types. The various message types may be identified to be Data frames, Remote frames, Error frames or Overload frames. Measurements relating to each type of message frame may be carried out to obtain further measurements as described. Also individual node performance parameters, for example time occupied by a particular node, may be measured.

Figure 3:
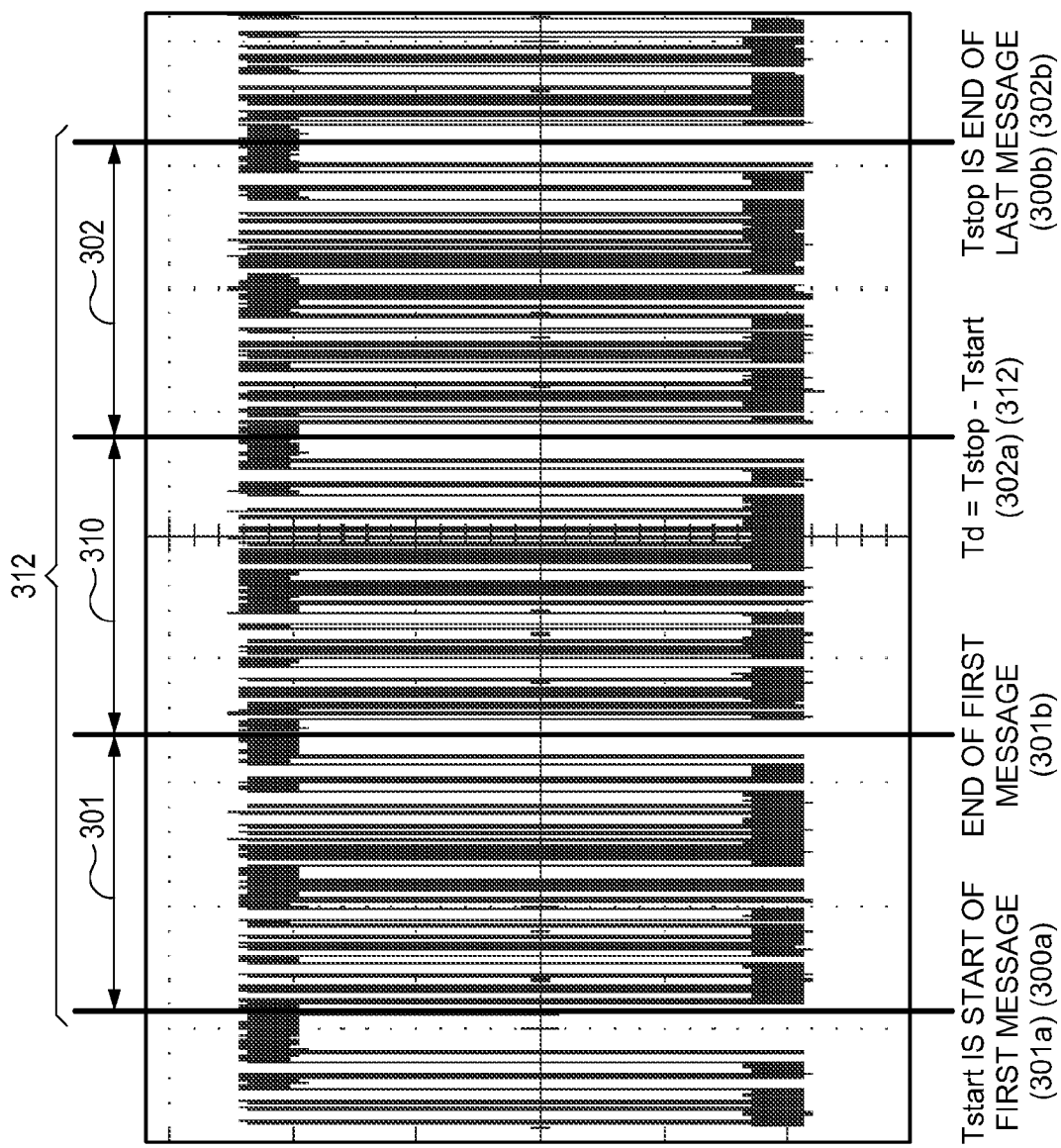
FIG. 3 shows an exemplary acquisition record of CAN message frames as produced according to one embodiment of the present invention.

Bus occupancy measurements are explained as follows. An exemplary acquisition record of CAN protocol message frames is shown in FIG. 3. Start of each of the frames is identified and referred to as T-start and is associated with an edge of the data stream. Similarly, the end of the frame may be referred to as T-end. A CAN protocol message frame (301) has an associated T-start (301a) and T-end (301b). The entire acquisition record may have an associated start time (300a), which refers to the time T-start (301a) of the first message frame (301). The acquisition record may be considered as terminated at T-end of the last message frame, which may be referred to as T-stop (300b) for the acquisition record. The complete CAN message time associated with the acquisition record may thus be calculated by subtracting the time T-start (300a) from the time T-stop (300b). This may also be referred to as complete bus occupancy time (T-d) (312) for a given acquisition record.

The time elapsed between the end of one message to the start of the next message being transferred may be measured. This measurement may be referred to as the idle time of the bus. In the exemplary acquisition record of CAN protocol message frames, as shown in FIG. 3, the idle time (310) between the pair of message frames (301), (302) may be calculated to be (302a-301b). The time, referred to as T-occupy, for which the bus is occupied by messages may be calculated by accumulating time associated with each message frame, which may mathematically be represented as:

$$T\text{-occupy} = \Sigma_{i=1} \text{ to } nB(i)$$

where time associated with each message frame may be referred to as B (i) and n may represent the number of message frames in the acquisition record.

In order to obtain an accurate measurement of the load on the bus, the obtained measurements relating to T-occupy and T-d may be used. The load on the bus, B-load, may be represented mathematically as:

$$B\text{-load} = T\text{-occupy}/T\text{-d}$$

The bus occupancy and the load on the bus may be measured and analyzed intermittently. These measurements also may be available periodically, the time interval for which may be defined and varied. For example, such measurements may be updated every 4 seconds to reflect the bus occupancy and bus load for the measured time interval.

Message Frame measurements are explained as follows. In order to get further information about bus occupancy, each message frame type may separately be analyzed. Accordingly, the message frame types may be identified to be a Data frame, Remote frame, Error frame or Overload frame and separately categorized. This enables CAN network designers to look at the type of the message frame occupying the bus, and further enables them to understand the performance parameters in order to, accordingly, re-design or modify the CAN network.

Time occupied by a particular type of message frames may be calculated for a given time interval. For example, in a given time interval the Error frames may be separately identified. On analysis the amount of time occupied by Error frames may be found to be high, which is considered non-efficient utilization of the bus. A high level of Error frames may help a designer infer that a miss-synchronization may be occurring in the network. The designer may thus focus on reducing the number of Error frames in order to optimize the bus usage.

Node occupancy measurements are explained as follows. Nodes of the CAN network may also be separately analyzed for better understanding of the performance of the CAN network. The acquired waveform from the CAN bus, after conversion into the bitstream, may be analyzed by decoding the bitstream to obtain information about the node that initiates a particular message frame. Analysis may be carried out for node occupancy from an acquired set of data available for post-analysis. In one embodiment, the user may be presented with measurements related to a particular node as requested by the user.

Occupancy of the bus by a particular node may be calculated by accumulating the time occupied by message frames from a particular node. Since accurate measurements of the time occupied by each frame with associated node information is already acquired, such measurements may be used. This allows separation of the idle time of the bus, which may not be accounted for in a node occupancy measurement. Accordingly, the time occupied T-koccupy by a particular node k may be mathematically represented as:

$$T\text{-}k\text{occupy} = \Sigma_{n=0 \text{ to } z-1} T(n)$$

where T (n) refers to the time taken by the $n^{th}$ message packet for a particular node, while the message time for packets n to z−1 is measured. The associated busload (T-kload) caused may be calculated, which may be mathematically represented as:

$$T\text{-}k\text{load} = T\text{-}k\text{occupy}/T\text{-}d$$

Measurements of bus occupancy by individual nodes may help in optimizing the scheduling algorithm of the CAN network under consideration.

Figure 4A:
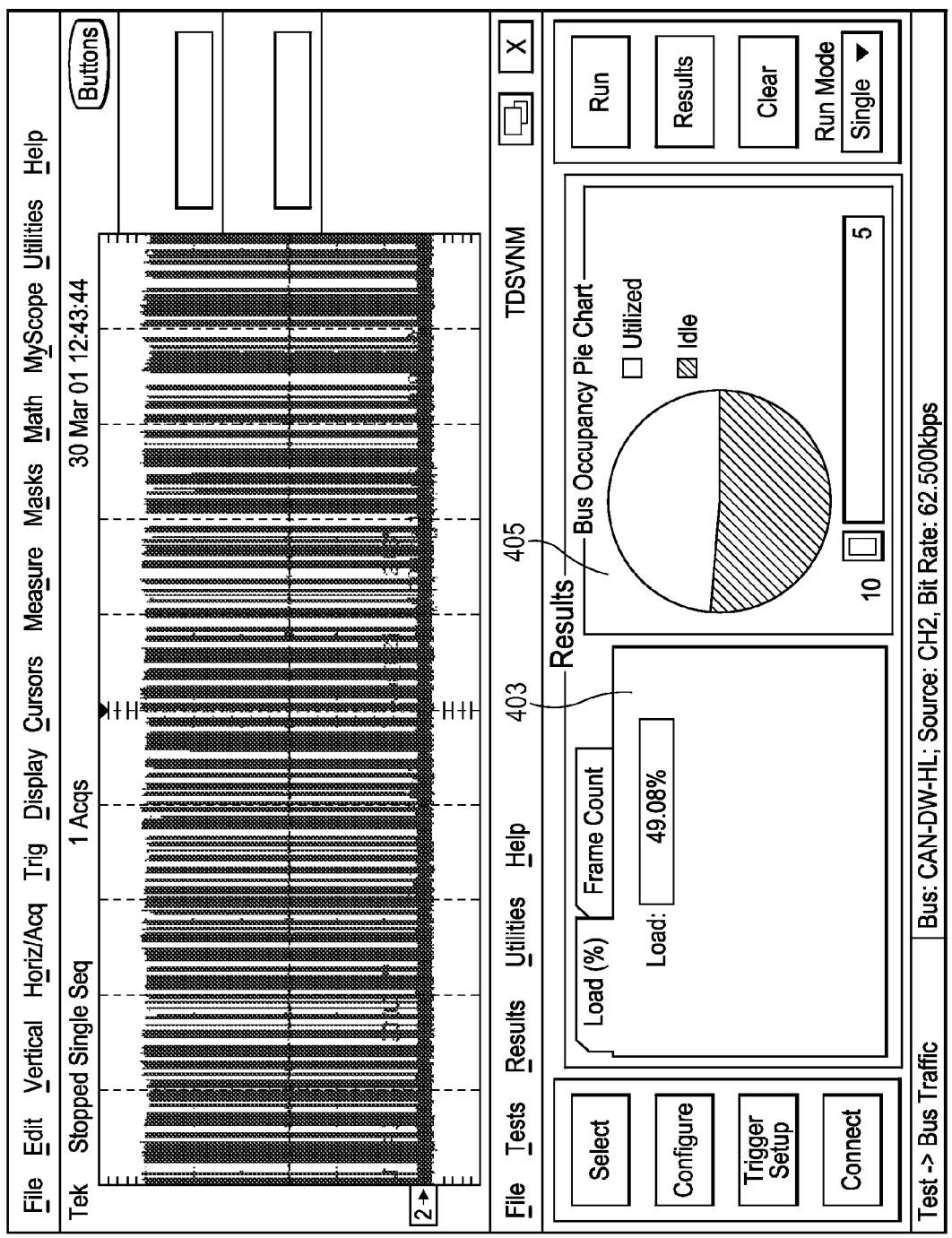
FIGS. 4A, 4B and 4C are displays of measurements according to different embodiments of the present invention.
Figure 4B:
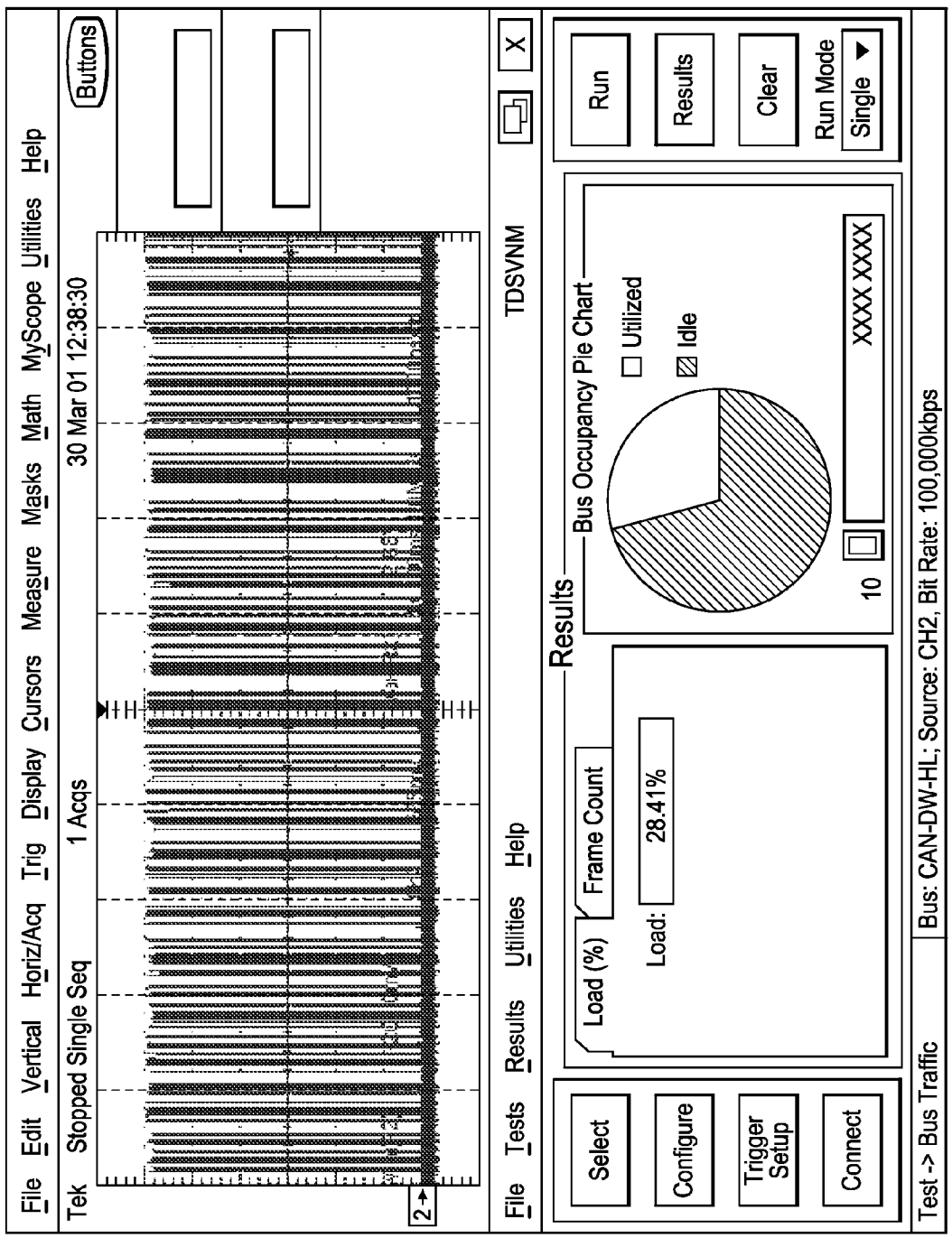
Figure 4C:
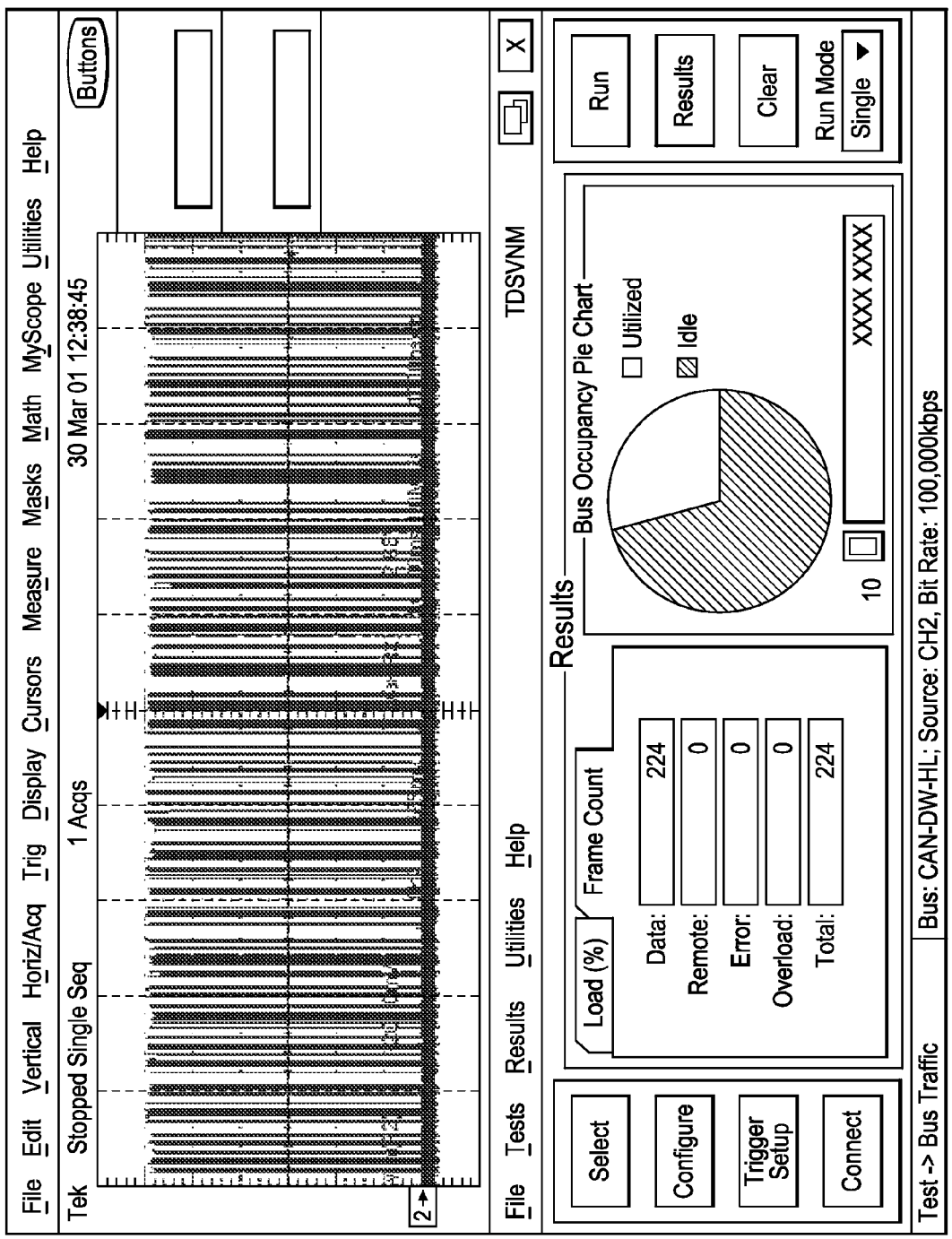

Each of the measurements carried out for CAN measurements as described above may be displayed as a graphical representation, as shown in FIGS. 4A, 4B and 4C. A display (401) may represent information in a data display (403) and a graphical display module (405). FIGS. 4A and 4B illustrate the difference in bus occupancy as a function of different Bit Rates.

The data display module (403) may numerically display the data associated with each measurement. The display (401) may be configured to update periodically at a defined interval, which may be varied for different measurements. FIGS. 4B and 4C show displays taken 15 seconds apart, with FIG. 4B showing Load % in the data display (403) and FIG. 4C showing Frame Count in the data display.

To obtain a quick understanding of the CAN network performance from the obtained measurements the graphical display module (405) is provided. The display (401) may provide visual representation of bus occupancy and other related measurements. For example, bus occupancy by a particular node may be presented in a pie chart. Further, comparative graphical representation between bus occupancy by various nodes may be provided. This allows the CAN network designer to quickly analyze and take necessary corrective steps in optimizing CAN network design.

In one embodiment of the present invention a user interface module is provided in the display (401). The user interface module allows a user to feed a unique identifier of a node referred to as ID. Subsequently, bus occupancy measurements by that particular node are presented to the user. One skilled in the art will recognize that various analyses may be carried out using the method to optimize CAN network design.

The foregoing description of the invention has been described for purposes of clarity and understanding. It is not intended to limit the invention to the precise form disclosed. Various modifications may be possible within the scope and equivalence of the appended claims.

We claim:

1. A method of measuring bus traffic on a controller area network (CAN), for use in an oscilloscope, comprising the steps of:
   acquiring, with said oscilloscope, a CAN bus signal in the form of a waveform in realtime;
   converting the waveform into a bitstream;
   analyzing the bitstream to measure bus occupancy on the CAN; and
   displaying a representation of said waveform and a graphical indication of said bus occupancy on a display screen of said oscilloscope; wherein
   the analyzing step comprises the steps of:
   converting the bitstream into CAN protocol messages;
   identifying a start time and a stop time for each CAN protocol message;
   computing the bus occupancy as a function of an amount of time within the bitstream occupied by the CAN protocol messages determined between a start and a stop time for each CAN protocol message in the bitstream and of total time determined between the start time of a first CAN protocol message in the bitstream and the end time of a last CAN protocol message in the bitstream.

2. The method as recited in claim 1 wherein the bus occupancy is determined for a particular type of the CAN protocol messages.

3. The method as recited in claim 1 wherein the bus occupancy is determined for a particular node of the CAN as determined from the CAN protocol messages.

4. The method as recited in claim 1 wherein the bus occupancy is determined for a particular node of the CAN.

5. The method as recited in claim 1 further comprising the step of repeating the acquiring, converting and analyzing steps.

6. The method as recited in claim 5 wherein the repeating step comprises the step of repeating the acquiring, converting and analyzing steps periodically.

7. The method as recited in claim 1, wherein the step of displaying further includes the step of displaying an identifier of frame type along with said display of said waveform and said graphical display of bus occupancy, wherein
   said indicator of frame type identifies said frame as being one of a data frame, a remote frame, and error frame, or an overload frame.

* * * * *